United States Patent
Angelopoulos et al.

(10) Patent No.: US 10,872,173 B2
(45) Date of Patent: Dec. 22, 2020

(54) SECURE LOW-LATENCY CHIP-TO-CHIP COMMUNICATION

(71) Applicant: Marvell Asia Pte, Ltd., Singapore (SG)

(72) Inventors: Georgios Angelopoulos, Marlborough, MA (US); Steven C. Barner, Shrewsbury, MA (US); Richard E. Kessler, Shrewsbury, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 239 days.

(21) Appl. No.: 16/142,698

(22) Filed: Sep. 26, 2018

(65) Prior Publication Data

US 2020/0097681 A1 Mar. 26, 2020

(51) Int. Cl.
*G06F 21/72* (2013.01)
*H04L 9/08* (2006.01)
*H04L 29/06* (2006.01)
*H04L 9/06* (2006.01)

(52) U.S. Cl.
CPC ............ *G06F 21/72* (2013.01); *H04L 9/0625* (2013.01); *H04L 9/0861* (2013.01); *H04L 63/0435* (2013.01)

(58) Field of Classification Search
CPC ..... G06F 21/72; H04L 9/0625; H04L 9/0861; H04L 63/0435
See application file for complete search history.

(56) References Cited

U.S. PATENT DOCUMENTS

| 9,473,296 | B2 | 10/2016 | Mathew et al. | |
|---|---|---|---|---|
| 2010/0124328 | A1* | 5/2010 | Schneider | H04L 9/0618 380/42 |
| 2011/0231673 | A1* | 9/2011 | Alekseev | G06F 7/00 713/190 |
| 2014/0123147 | A1* | 5/2014 | Pantaleoni | G06F 16/90344 718/102 |
| 2015/0039904 | A1* | 2/2015 | Matsuda | H04L 9/0618 713/189 |
| 2015/0074159 | A1* | 3/2015 | Poschmann | G09C 1/00 708/270 |
| 2016/0149696 | A1* | 5/2016 | Winslow | H04L 9/12 380/28 |

OTHER PUBLICATIONS

Borghoff J. et al., "PRINCE—A Low-Latency Block Cipher for Pervasive Computing Applications" In: Wang X., Sako K. (eds) Advances in Cryptology—ASIACRYPT 2012. LNCS, vol. 7658, pp. 208-225. Springer, Heidelberg (2012).

* cited by examiner

*Primary Examiner* — Ayoub Alata
(74) *Attorney, Agent, or Firm* — Hamilton, Brook, Smith & Reynolds, P.C.

(57) ABSTRACT

An encryption interface provides secure, low-latency communications between processors. A first processor block transforms initial data into encrypted data using a cipher for receipt by a second processor block, which transforms the encrypted data into decrypted data. The first processor block utilized a crypto circuit having a plurality of stages, each of which generate a subset of a cipher digit stream for encrypting the data. The second processor block receives and decrypts the encrypted data using a respective decryption circuit.

20 Claims, 3 Drawing Sheets

SECURE LOW-LATENCY CHIP-TO-CHIP COMMUNICATION

BACKGROUND

Multi-socket processors that communicate internally between multiple nodes or processor units through high-speed links are becoming increasingly common in all fields of computing. Multi-socket processors often perform tasks simultaneously at multiple computational entities. The processors' different computational entities need to exchange data each other in cross-chip transactions. To optimize processor function and speed, it is necessary to attempt to minimize latency of cross-chip transactions. High latency can cause delay in completing the tasks being carried out by a processor.

Because of an increasingly hostile environment and widespread security threats, it is desirable to transfer data, even internal cross-chip transactions within multi-socket processors, in an encrypted fashion so that unauthorized entities cannot steal or spy on sensitive information. Several methods have been proposed and implemented to provide cryptographically secure communication, such as Triple Data Encryption Algorithm (3DES) and Advanced Encryption Standard (AES). However, given the speed and latency requirements for internal transactions within multi-socket processors and the power and area constraints of modern processors, the prior art fails to ensure secure communication in a sufficiently efficient way. Therefore, a need exists for a lightweight, low latency, low power, and secure method of chip-to-chip communication that can be adapted to work for internal communications between processor units of a multi-socket processor.

SUMMARY

Example embodiments include a circuit for high speed, low latency secure communication. The circuit may include a first processor block configured to transform initial data into encrypted data using a cipher, a second processor block configured to transform the encrypted data into decrypted data that is corresponding to the initial data, and a bus connecting the first processor block and the second processor block. The first processor block is configured to forward the encrypted data to the second processor block via the bus.

The first processor block includes a first registry configured to store a first key and a first set of parameters. The first set of parameters may be an initial variable and number used once. The first processor block also includes a first crypto circuit configured to generate a cipher digit stream from the first key and first set of parameters. The first crypto circuit further includes a plurality of states and each state generates a subset of the cipher digit stream during a distinct clock cycle. The first crypto circuit also includes an encryption circuit configured to generate encrypted data by applying the cipher digit stream generated by the first crypto circuit to the initial data.

The second processor block includes a second registry configured to store a second key and a second set of parameters. The second set of parameters may be an initial variable and number used once. The second set of parameters may match the first set of parameters and the second key may match the first key. The second processor block further includes a second crypto circuit configured to generate the cipher digit stream from the second key and the second set of parameters. The second processor block also includes a decryption circuit configured to generate the decrypted data by applying the cipher digit stream generated by the second crypto circuit to the encrypted data.

The first and second processor blocks may be nodes of a multi-socket processor. Additionally, the cipher digit stream generated by the first and second crypto circuits may be the PRINCE block cipher created by imputing the first key and first set of parameters or second key and second set of parameters into the PRINCE algorithm. The first and second crypto circuits may also comprise at least two engine circuits and each engine circuit is configured to generate a finished portion of the cipher digit stream.

The circuit may additionally include a transmission circuit, located on the first processor block configured to send the data back across the bus wherein the data includes the encrypted data, an error detection code and unique sequence number. In this case, the circuit further includes a receiver circuit, located on the second processor block, configured to receive the data from the bus and determine, based upon the error code and the unique sequence number, if a copy of the data needs to be reset. Finally, the circuit additionally includes a retry buffer block located on the first processor block, configured to temporarily store a backup copy of the sent data and further configured to resend the data based upon the determination that the data needs to be resent.

The first processor block may be further configured to generate a symmetric key, initial value and a number used once and write, in the first registry, the symmetric key as the value of the first key and the initial value and a number used once as the values of the first set of parameters. The first processor may also be further configured to instruct the second processor block to write, in the second registry, the symmetric key as the value of the second key and the initial value and number used once as the values of the second set of parameters.

In one embodiment of the circuit, at least one of the values of the first set of parameters is changed and at least one of the values of the second set of parameters is changed after the encrypted data is forwarded.

The first processor block may also be configured to update the values of the first set of parameters and the second processor block may be configured to update the values of the second set of parameters so that the second crypto circuit continues to generate the same cipher digit stream as the first crypto circuit. The second processor block may be further configured to delay updating the values of the second set of parameters for a time period, the time period being the time between the first processor block updating the values of the first set of parameters and the second processor block receiving the encrypted data generated using the updated values of the first set of parameters.

The first and second processor blocks may each include an input circuit configured to receive a signal and in response to receiving the signal the first and second processor blocks are further configured to reset the values of the first key, second key, first set of parameters, and second set of parameters.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A cipher digit stream is the output of a complex algorithm that is used to encrypt data to secure the data from unauthorized access. The algorithm that generates a cipher digit stream requires the input of a key and a set of parameters (usually an initial variable and a number used once). One cipher digit stream is the PRINCE block cipher, generated by the PRINCE algorithm, which can transform plaintext data into encrypted data. The encrypted data can be decrypted only with a matching cipher digit stream generated by a key and set of parameters with the same value as the key and the set of parameters used to generate the cipher digit stream are used to transform the plaintext data. The PRINCE cipher is a lightweight cipher digit stream that causes minimal latency delays and requires low silicon area overhead, low power and minimal warm-up time. It is possible to include circuitry that applies the PRINCE block cipher to data sent in cross-chip transactions between the computational units of a multi-socket processor. Therefore, the cross-chip transactions can be securely encrypted for transmission and decrypted when received without introducing substantial latency delays.

Figure 1:
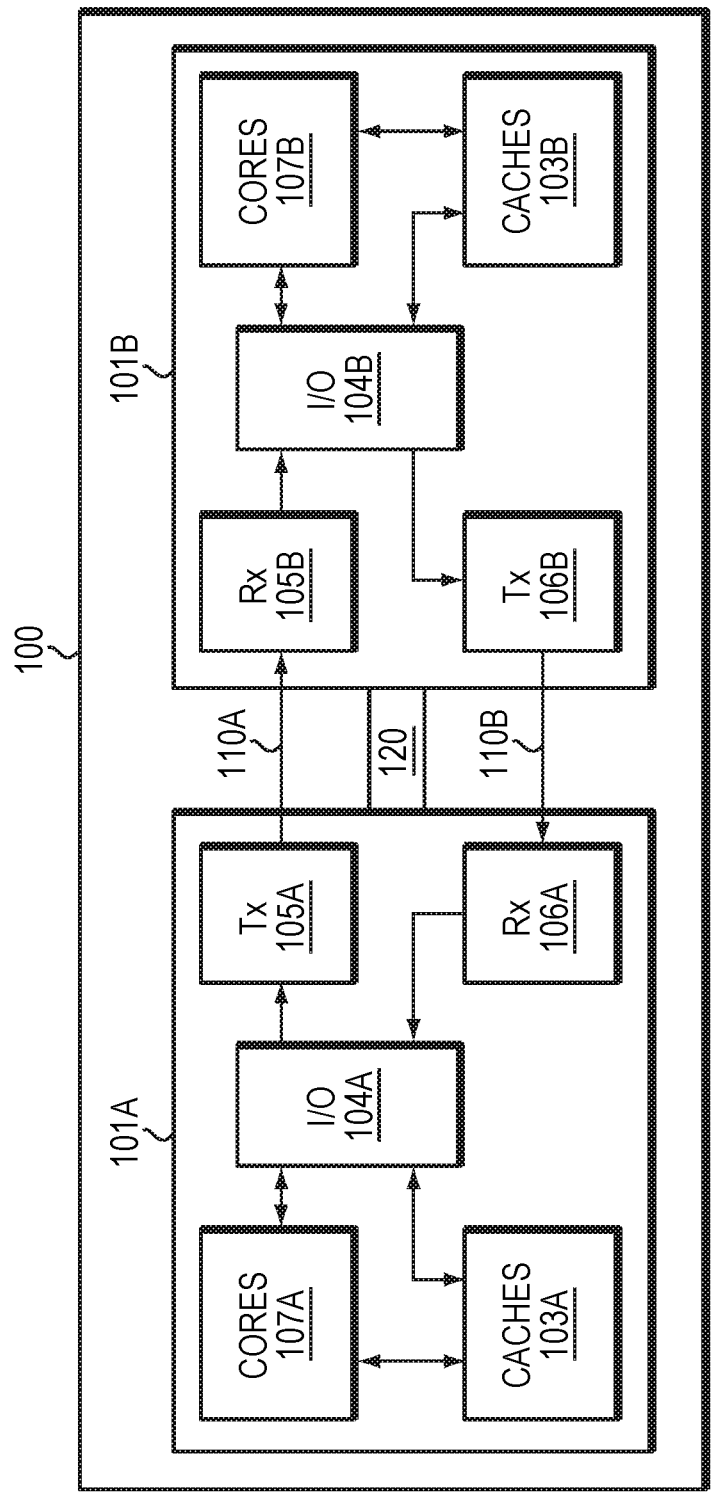
FIG. 1 is a block diagram of a circuit in one embodiment of the invention.

FIG. 1 is a block diagram of a circuit in one embodiment of the invention. Processor 100 is a multi-socket processor with two computational units 101A and 101B. Processor 100 may have any number of computational units. The computational units 101A and 101B are independent processing units, processor blocks, that are capable of reading and executing code or portions of code using cores 102A and 102B, caches 103A and 103B, input/output devices (I/O devices) 104A and 104B. In some alternate embodiments computational units 101A and 101B may share a single set cache and/or I/O device. The computational units 101A and 101B are configured to perform parallel computing. The computational units 101A and 101B can exchange data through a communication medium such as bus 120. The bus 120 may comprise any suitable material, such as a wired channel.

The computational units 101A and 101B further include transmission circuits (Tx) 105A and 105B and receiving circuits (Rx) 106A and 106B. In an alternative embodiment, used for encrypting data sent, one directions the first computational unit 101A may only include a transmission circuit 105, and the second computational unit 101B may only include a receiving circuit 106. The transmission circuits 105A and 105B are partially composed of circuitry that transforms plaintext data into encrypted data which is protected from potential outside security incursions and threats. In some embodiments, the transmission circuits 105A and 105B transform plaintext data into encrypted data by applying the PRINCE cipher. Circuitry that applies the PRINCE cipher requires low silicon area overhead and little power consumption reducing the burdens that including the transmission circuits 105A and 105B has on the manufacturing, performance, power requirements of computational units 101A and 101B and therefore, multi-socket processor 100.

The receiving circuits 106A and 106B are partially composed of circuitry that transforms encrypted data back into plaintext data which can then be used by cores 102A and 102B, caches 103A and 103B, and I/O devices 104A, and 104B. In some embodiments receiving circuits 106A and 106B transform encrypted data back into plaintext data by reapplying the PRINCE cipher.

A non-limiting example of encrypted chip-to-chip, low-latency, high-speed communication begins with cores 102A and/or caches 103A generating data at computational unit 101A. Alternatively, the cores 102A and/or caches 103A may instruct I/O device 104A to read data from off-chip memory. This data may be a 128-bit string comprised of plaintext. This plaintext data is then sent to I/O device 104A, which then sends it to the transmission circuit 105A. The transmission circuit 105A transforms the plaintext data into encrypted data by applying a cipher digit stream. In some embodiments, this cipher digit stream is the PRINCE cipher. If the cipher digit stream is the PRINCE cipher or a comparable cipher, the transformation process is a low-latency, high-speed process that causes minimal delay in the transferring of data. The encrypted data can then be securely transmitted 110A from the first computational unit 101A to the second computational unit 101B across bus 120. The encrypted data is received by receiving circuit 106B. Receiving circuit 106B transforms the encrypted data into plaintext data by applying a cipher (also referred to as a cipher digit stream). The cipher applied by receiving circuit 106B may match the cipher applied by the transmission circuit 105A, and can be generated using the same values for a key and set of parameters. The unencrypted data is then sent through the I/O device 104B to be utilized by cores 102B and caches 103B.

Computational unit 101B may also use transmission circuit 105B to encrypt and transmit data 110B across bus 120 to computational unit 101A, which receives and decrypts the data with receiving circuit 106A. Transmission circuit 105B and receiving 106A may share the same cipher as transmission circuit 105A and receiving circuit 106B. Alternatively, transmission circuit 105B and receiving 106A may generate and apply their own ciphers separate and unrelated to the ciphers generated and applied by transmission circuit 105A and receiving circuit 106B.

Figure 2A:
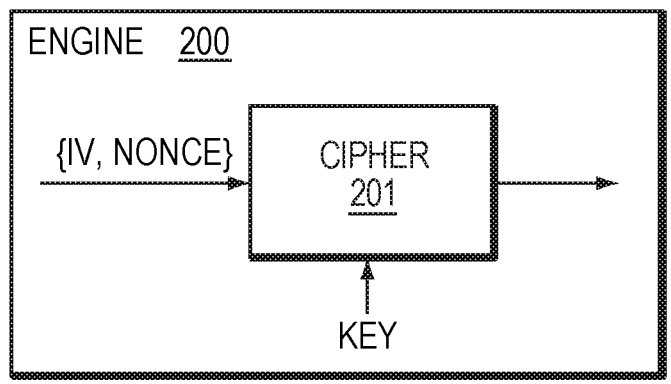
FIG. 2A is a diagram of the generation of the cipher digit stream by an engine circuit.

FIG. 2A is a diagram illustrating the generation of the cipher applied by the transmission 105 and receiving 106 circuits. The engine 200 is a circuit that performs mathematical functions that collectively compose the algorithm that generates the cipher digit stream 201. The cipher digit stream 201 is generated from three variables: a key, an initial variable (IV) and number used once (nonce). These variables are also referred to as the key and the set of parameters. For each unique combination of values for the three variables, engine 200 may generate a unique cipher digit stream 201. The algorithm performed by engine 200 may be the PRINCE algorithm, which generates the PRINCE block cipher. The full details of the mathematical functions that collectively compose the PRINCE algorithm are contained in Borghoff J. et al. PRINCE—A Low-Latency Block Cipher for Pervasive Computing Applications. In: Wang X., Sako K. (eds) Advances in Cryptology—ASIACRYPT 2012. LNCS, vol. 7658, pp. 208-225. Springer, Heidelberg (2012) which is hereby incorporated by reference in its entirety. The PRINCE algorithm generates a 64-bit cipher digit stream, which may be combined with another 64-bit cipher digit stream to form a 128-bit cipher digit stream.

The algorithm that generates cipher digit stream 201 from the input variables is composed of a collection of discreet mathematical functions, such as matrix transformations, which are performed by engine circuit 200. The mathematical functions of the algorithm that generates cipher digit stream 201 can be divided into multiple stages. Engine circuit 200 can perform the mathematical functions of each stage sequentially. Therefore, the process of generating cipher digit stream 201 can be divided into multiple steps, with each step being the performance of a single stage of the algorithm containing a group of mathematical functions. Each stage can be performed by engine 200 during a single processor clock cycle. The number of stages the mathematical functions are divided into may be configurable. Having the number of stages be alterable allows for a balance of security and computational requirements to be reached. Furthermore, engine 200 can employ pipelining where, in a similar manner to an assembly line, engine 200 can be working to generate multiple cipher digit streams concurrently, where each cipher digit stream 201 being generated is having a different stage of its algorithm being performed. Engine 200 may use different values of the input variables for each of the multiple cipher digit streams it can concurrently generate. However, once a cipher digit stream starts to be generated, each stage may still use the same input variables the earlier stages used.

Pipelining allows for a cipher digit stream 201 to be consistently generated instead of generated only when requested or required. If a cipher digit stream is only generated when needed, the time and computing power necessary to generate the cipher digit stream may cause a delay in the encryption or decryption of data and an increase in latency in the function of computational units 101A and 101B. Pipelining also reduces the computational complexity being performed in a single processor clock cycle by engine circuit 200 reducing the chip area overhead and power required of engine circuit 200 and of any circuit or processor component containing engine circuit 200.

Figure 2B:
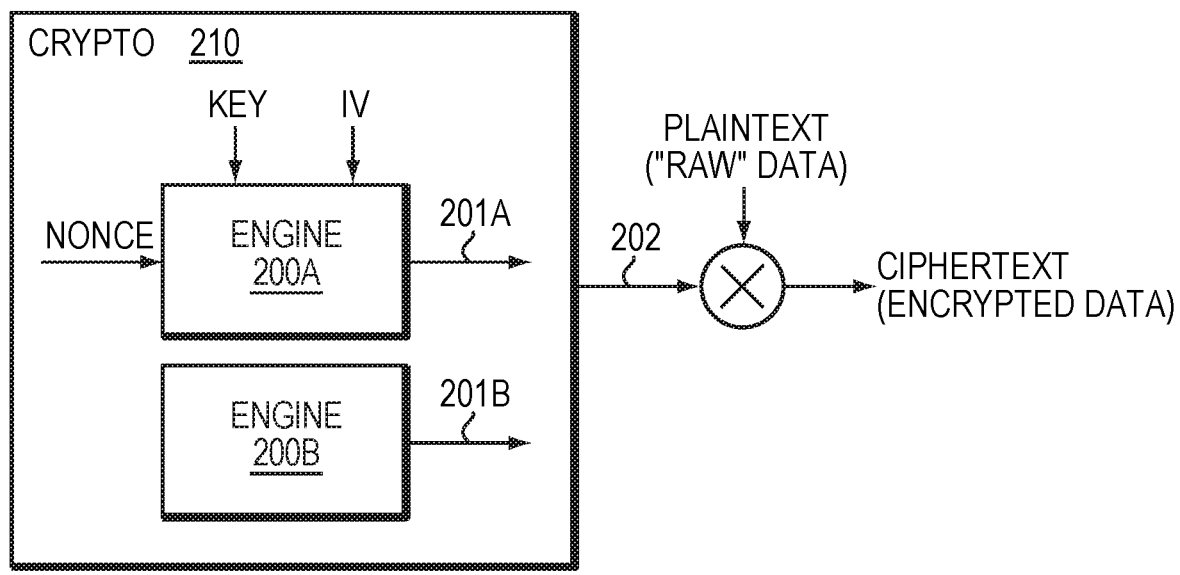
FIG. 2B is block diagram of a crypto circuit that may be utilized by embodiments of the invention.

FIG. 2B is block diagram of a crypto circuit in an example embodiment. The crypto circuit 210 may be a portion of the transmission 105 and receiving 106 circuits located on computational units 101A and 101B. The crypto circuit 210 contains an engine 200, which generates a cipher digit stream 201 using an algorithm with a key, IV, and nonce as input variables. In some embodiments, crypto circuit 210 contains multiple engines 200A and 200B that generate cipher digit streams 201A and 201B. These cipher digit streams may be combined to form a single cipher digit stream 202. Engines 200A and 200B may share any of the three input variables (key, IV, nonce) or may have use different variables. Engines 200A and 200B may also utilize pipelining and consistently generate a cipher digit stream to be utilized, by crypto circuit 210, when needed. Engines 200A and 200B may use the PRINCE algorithm, as described above, to each generate a 64-bit cipher digit stream 201A and 201B. The 64-bit cipher digit streams 201A and 201B may be combined in crypto circuit 210 to output a 128-bit cipher digit stream 202. Similarly, multiple digit streams can be combined to output a cipher digit stream more than 128-bit, not necessarily being an integer multiple of 64. Alternatively, the crypto circuit 210 may only output a 64-bit cipher digit stream generated by a single engine 200A or 200B.

Once generated, a cipher digit stream can be used to encrypt or decrypt data. The transmission circuit 105 is configured to transform plaintext or raw data with a generated cipher digit stream to create ciphertext or encrypted data. The manner in which the cipher digit stream transforms plaintext is determined, in part, by the input variables (key, IV, and nonce) used in the generation of the cipher digit stream. Data that is encrypted typically cannot be utilized until it is decrypted. Therefore, once data is encrypted, it can be safely transferred between computational units while remaining protected from unauthorized attempts to access or read it.

The receiving circuit 106 is configured to be able to transform encrypted data back into plaintext or raw data with a generated cipher digit stream. However, the cipher digit stream used to transform encrypted data back into plaintext used must match the cipher digit stream used to originally transform the plaintext or raw data into ciphertext or encrypted data. In order to generate a matching cipher digit stream, the input variables (key, IV, and nonce) used to generate the original cipher digit stream must be known or calculated. Therefore, only the knowledge of and/or ability to calculate the input variables used to generate the original cipher digit stream provides the ability to generate a matching cipher digit stream, use the matching cipher digit stream to transform encrypted data back into plaintext or raw data, and read or utilize the now decrypted data.

A 128-bit cipher digit stream 202 may be generated by crypto circuit 210 combining the 64-bit output 201A and 201B of two engines 200A and 200B. Alternatively, there may be any amount of engine circuits 200A and 200B configured to generate any size cipher digit stream that can be combined to form a composite cipher digit stream of any size and complexity. If the generated cipher digit stream is 128 bits long then the plaintext data that get encrypted can also be 128 bits. A 128-bit cipher digit stream can be used to transform 128 bits of plaintext or raw data into 128 bits of ciphertext or encrypted data. A 128-bit cipher digit stream can also be used to transform 128 bits of plaintext data with a header into 128 bits of ciphertext or encrypted data with an unencrypted header. A matching 128-bit cipher digit stream can similarly reverse the transformation. Alternatively, crypto circuit 210 may be configured to, upon command, generate a 64-bit cipher digit stream using only the output of one of the two engine circuits 200A and 200B. The 64-bit cipher digit stream digit stream can be used to transform 128 bits of plaintext or raw data into 64 bits of plaintext or raw data and 64 bits of cyphertext or encrypted data. Only encrypting half of 128 bits of data can be used to reduce the computational requirements of encryption if only a portion of the 128 bits of data requires protection. The cipher digit streams used to encrypt or decrypt data may be PRINCE block ciphers. Engines 200A and 200B in crypto circuit 210 may use the PRINCE block algorithm and may perform that algorithm in stages with each stage being performed during a single processor clock cycle. Engines 200A and 200B may utilize pipelining by concurrently performing different stages of the multiple algorithms used to generate different cipher digit streams during a single processor clock cycle. Engines 200A and 200B may output a cipher digit stream at least at every other processor clock cycle.

Returning to FIG. 1, in order to provide the ability to encrypt data at computational unit 101A with transmission circuit 105A send the encrypted data 110A across bus 120 and decrypt the data at computational unit 101B with receiving circuit 106B, transmission circuit 105A and receiving circuit 106B need to generate matching cipher digit streams. To generate matching cipher digit streams, each computational unit 101A and 101B can receive or calculate the input variables (key, IV, nonce) that the transmission or receiving circuit on the other computational unit is using.

When the multi-socket processor begins to boot-up, initial values for the initial variables must be determined. During the boot-up periods, processor 100, including computational units 101A and 101B, is controlled by secure and verified firmware, which sets critical settings and initializes all components of the system. During boot-up it may be necessary to ensure that both computational units 101A and 101B start with the same values of the input variables to ensure that matching cipher digit streams can be generated. To accomplish this, one computational unit, for example computational unit 101A, will be designated as the master and the other (or multiple other) computational unit 101B will be designated as the slave in a master/slave communication protocol. The master computational unit 101A will generate or receive from an external source, such as secure firmware, values of a key, IV, and nonce. The master computational unit 101A will store the values in a first registry for use to generate a cipher digit stream at the transmission circuit 105A and/or receiving circuit 106A. The master computational unit 101A will instruct the slave computational unit 101B to write the same values in a second registry to use as the key, IV, and nonce for use to generate a cipher digit stream at the transmission circuit 105B and/or receiving circuit 106B. The master computational unit 101A may repeat this process for any number of initial values for input variables to be used by any number of sets of receiving and transmission circuits, e.g. 105A to 106B and 105B and 106A, so that each set of receiving and transmission circuits may utilize a different matching set of values of the input values.

Both computational units 101A and 101B also contain a pseudo-random generator, such as a linear-feedback shift register (LFSR). During boot-up, the pseudo-random generators of each computational units 101A and 101B are seeded with the same initial seed. This may be done through the master/slave communication protocol. An alternative method to instructing the slave computational unit to write specific values for the input values is for the master computational unit to only provide a matching seed for a pseudo-random generator and instruct the slave computational unit to use that seed to derive matching input values.

After boot-up is complete and encrypted transmission has been occurring, in order to maintain and enhance the security of the communications between computational units 101A and 101B, the values of the input variables used to generate the cipher digit streams may be updated. Processor 100 and computational units 101A and 101B may be configured to update the values of any combination of the three input variables (Key, IV, nonce). Furthermore, processor 100 and computational units 101A and 101B may be configured to update the values of the input variables separately and under different circumstances or have the updating of the values each input variable be governed by separate protocols. In order for the computational units 101A and 101B to retain encrypted communication capabilities, the value of the input variables may remain matched when they are updated. However, the input variables new values cannot be expressly shared between computation units 101A and 101B as that would broadcast the ability to decrypt the data transformed by the new cipher digit stream generated with the new values of the input variables.

One way to ensure symmetric updating of the values for the input variables used by computation units 101A and 101B is to periodically update the values of the input variables after a defined threshold is met. If both computation units 101A and 101B know the threshold, they can and will update the input variable values at the same time, without any unencrypted communication triggering the update. The threshold may be defined as a certain amount of time or after a certain number of packets have been exchanged between the computational units 101A and 101B. For example, computation units 101A and 101B may use the value of the initial variable (IV) as a counter with the threshold for updating the value of the IV being set to one communication sent. Therefore, after a transmission is sent from computation unit 101A to computational unit 101B both units 101A and 101B update the value of their IV by one. For example, if the IV used was n, the new IV becomes n+1. Alternatively, instead of updating values by a known number or to a predetermined value, a pseudo-random generator may be used to provide additional protection. As described above, both computation units 101A and 101B share the same seed for a pseudo-random generator. A new value for an input variable can be created with the pseudo-random generators. However, because computation units 101A and 101B share the same seed the updated input variable values created by computation units 101A and 101B will remain in sync.

In addition to the above method, some portions of the transmitted data between computational units 101A and 101B may remain unencrypted. This unencrypted data may be located in a header or in the main section of the transmitted data. This unencrypted data can be used to convey information other than sensitive files/data. The unencrypted data may be used to inform the computational units 101A and/or 101B to update values of the input variables. The input variables used by computational units 101A and 101B can then be updated to predetermined values, or can be updated through the use of pseudo-random generators sharing seeds. In this manner, the computational units 101A and 101B can coordinate simultaneous updates to the input variable's values while not having to transmit the new values without encryption.

Computation units 101A and 101B may be further configured to receive external signals. The received signals can be from any source external or internal to processor 100, such as but not limited to software, firmware, and/or user input. The computation units 101A and 101B may be configured to, in response to receiving the signal and independent of any automatic process of updating the values such as a triggering threshold, manually reset, update, or change the values of the key, IV, and nonce used in by the engine circuits 200 in their respective crypto circuits 210. Allowing for the values of the input variables to be updated on demand provides the ability to react to security threats and other unpredictable problems.

The transmission of data between computation units 101A and 101B takes a non-zero amount of time. Therefore, there may be a slight delay from when computation unit 101A uses a cipher digit stream to encrypted data to when computational unit 101B uses a matching cipher digit stream to decrypted data. Therefore, if both computational units update the values of the input variables at the exact same time, there is a risk that data encrypted with a cipher digit stream generated with old values of the input variables at computational unit 101A is still in transit when a computational unit 101B has already finished generating a cipher digit stream with the updated variables. In this case, the new cipher digit stream will be unable to correctly decrypt the data encrypted with the old cipher digit stream. This creates an error, which can cause delay and latency. To prevent this from happening, computational unit 101B may delay updating the values of the input variables by the time it takes data to be transmitted from computational unit 101A to computational unit 101B. Computational unit 101B may be preprogrammed with the knowledge of the transmittal time or derive the time through calculations or measurements. By introducing this delay in changing the values of the input variables, computational unit 101B ensures that the new cipher digit stream will only be generated when it is receiving data that has been encrypted by a matching new cipher digit stream at computational unit 101A.

Figure 3:
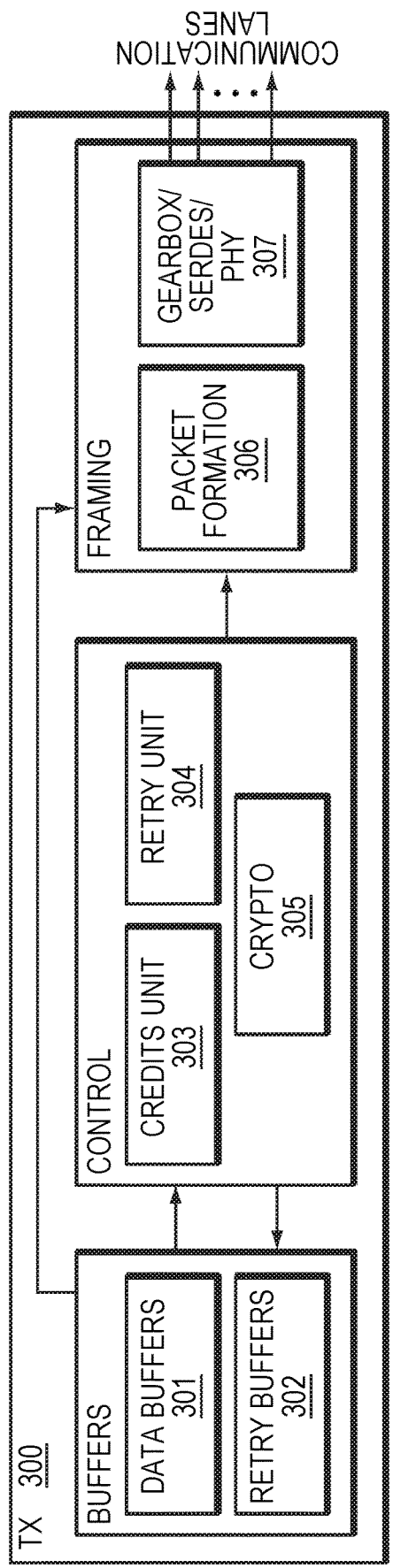
FIG. 3 is a block diagram of a transmission circuit that may be utilized by embodiments of the invention.

FIG. 3 is a block diagram of a transmission circuit that may be utilized by embodiments of the invention. Transmission circuit 300 is a more detailed view of the transmission circuits 105A and 105B shown in FIG. 1. Transmission circuit 300 receives data from an I/O device, e.g. I/O device 104A, generates a cipher digit stream, transforms the data into encrypted data using the cipher digit stream, prepares the data for transmission, and finally transmits the data. Transmission circuit 300 includes three general subparts: Buffers, Control, and Framing.

The buffers subsection of transmission circuit 300 includes two sets of buffers used to temporarily store data. The data buffers 301 store the data before it is transmitted and as it is encrypted and the retry buffers 302 store a backup copy of the data. The retry buffers 302 store the backup copy of data until data is successfully received, and a backup is no longer needed. The sets of buffers 301 and 302 may be configured to store data of any size. The buffers 301 and 302, in some embodiments of the invention, may be configured to store 128 bits of data. Once the data in the data buffers 301 is encrypted it is sent to the Framing section of transmission circuit 300 to be prepared for transmission.

The control subsection of transmission circuit 300 includes a credits unit 303, a retry unit 304 and a crypto unit 305. Crypto unit 305 may be crypto circuit 210 shown in FIG. 2B and contain engine circuits 201A and 201B as shown in FIG. 2A. Crypto unit 305 generates a cipher digit stream. Crypto unit 305 may utilize pipelining to generate a cipher digit stream at least every other processor clock cycle. The cipher digit stream generated by crypto unit 305 is used to transform the data stored in data buffers 301 into encrypted data and may, if necessary, be used to transform the backup data stored in retry buffers 302 into encrypted data. Retry unit 304 is configured to initiate a retransmission of data from data stored in the retry buffers 302 if necessary. Retry unit 304 is configured to initiate the retransmission based upon receiving a request from the destination of the transmitted data indicating an error occurred in receiving the data. Credits unit 303 performs flow control to avoid overflow of the receiving buffers. The flow control performed by Credits unit 303 may include the accounting of transmitted packets, incrementing a counter while a packet is transmitted, and decrementing the same counter upon the notification from the receiver for successful reception of a packet.

The framing subsection of transmission circuit 300 includes packet formation unit 306 and a communication block 307. The packet formation unit 306 takes data stored in data buffers 301 after it has been encrypted by the cipher digit stream generated by crypto unit 305 and formats it for transmission as a payload in a packet. Packet formation unit 306 may add a header containing any of the following information: an address, error detection/correction, hop counts, length, and priority. Packet formation unit 306 may utilize any type of known communications protocol to prepare data for transmission. Once prepared by packet formation unit 306, the communications block 307 transmits the packet containing the encrypted data as its payload to its destination, another processor block, across a communication medium such as a bus of any suitable material, such as a wired channel. The communication block 307 may be a Gearbox, SERDES, PHY or another device used for high speed communication.

Figure 4:
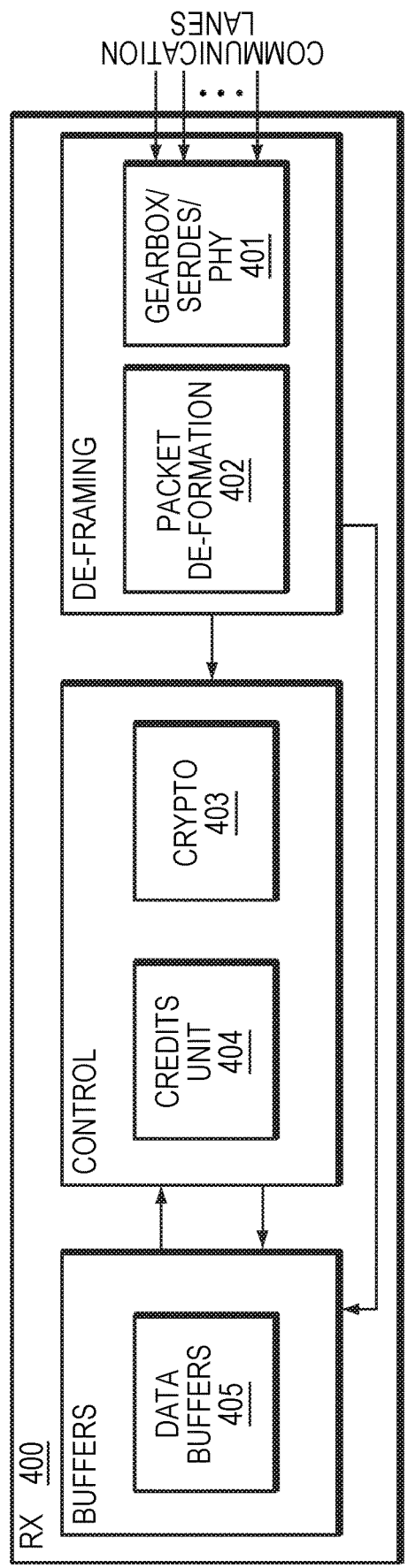
FIG. 4 is a block diagram of a receiving circuit that may be utilized by embodiments of the invention.

FIG. 4 is a block diagram of a receiving circuit that may be utilized by embodiments of the invention. Receiving circuit 400 is a more detailed view of the transmission circuits 106A and 106B shown in FIG. 1. Receiving circuit 400 receives data from a communication medium, such as bus 120, generates a cipher digit stream, transforms encrypted data into plaintext using the generated cipher digit stream, and passes the data to I/O device 104B, where it can then be utilized by cores 102B and caches 103B. Receiving circuit 400 includes three general subparts, Buffers, Control, and De-Framing.

The de-framing subsection of receiving circuit 400 includes a communication block 401 and a packet deformation unit 402. The communication block 401 may be linked with communication unit 307 and configured to receive transmissions from communication block 307 across a communication medium, such as bus 120. The transmission received by communication block 401 may be a packet with a header and a payload created by packet formation 306 of transmission circuit 300. The payload may contain data encrypted with a cipher digit stream generated by crypto unit 210, 305 of transmission circuit 300, 105A. The communication block 401 may be a Gearbox, SERDES, PHY or another device used for high speed communication. Once a packet is received with communication block 401 packet de-formation unit 402 reads the data contained in the payload of the packet in a manner dictated by its communication protocols and the information contained in the packet header. Packet de-formation unit 402 may be configured to process the header on the received packed and identify any of the following information: an address, error detection/correction, hop counts, length, and priority. Packet deformation unit 402 will then process the payload of the packet containing data in a manner dictated by its communication protocols and the information contained in the packet header.

The control subsection of receiving circuit 400 includes a crypto unit 403 and credits unit 404. Credits unit 404 performs flow control to avoid overflow of the receiving buffers. The flow control performed by Credits unit 403 may include the accounting of transmitted packets, incrementing a counter while a packet is transmitted, and decrementing the same counter upon the notification from the receiver for successful reception of a packet. Crypto unit 403 may be crypto circuit 210 shown in FIG. 2B and contain engine circuits 201A and 201B as shown in FIG. 2A. Crypto unit 403 generates a cipher digit stream. Crypto unit 403 may utilize pipelining to generate a cipher digit stream at least every other processor clock cycle. The cipher digit stream generated by crypto unit 403 is used to transform the encrypted data received by communications unit 401 into unencrypted of plaintext data.

The buffers subsection of receiving circuit 405 includes data buffers 400. Data buffers 405 temporarily store the encrypted data from the packet payload received by communication block 401 after it has been de-framed by packet deformation unit 402. The encrypted data stored in data buffers 405 is transformed into readable unencrypted plaintext data by applying a cipher digit stream generated by crypto unit 403 that is a matched cipher digit stream to the cipher digit stream used to initially encrypt the data generated. After the data stored in data buffers 405 is decrypted it can be read and utilized by the rest of computational unit 101B outside of receiving unit 400.

Transmission circuit 300 and receiving circuit 400 are used to enable high-speed and low-latency secure communication. The crypto units 305 and 403 of transmission circuit 300 and receiving circuit 400, respectively, create matching cipher digit streams using the same algorithm and same input variables. The algorithm used may be the PRINCE algorithm, which allows crypto units 305 and 403 to have low silicon area overhead, minimal latency overhead and zero warm-up time with no key-expansion while creating an encryption cipher that is high security and resistant against cryptanalysis attacks. The values of the input variables (IV, key, nonce) used by crypto units 305 and 403 of transmission circuit 300 and receiving circuit 400 may be updated, reset or changed simultaneously so that crypto units 305 and 403 of transmission circuit 300 and receiving circuit 400 continue to generate matching cipher digit streams.

Transmission circuit 300 may be configured to perform high-speed and low latency secure communication with any number receiving circuits 400 located on any number of processing blocks. Transmission circuit 300 and receiving circuit(s) 400 may be located on different nodes or processing units of a multi-socket processor. Transmission circuit 300 and receiving circuit(s) 400, when configured to use the PRICE algorithm, are particularly suited to performing secure communication between different nodes or processing units of a multi-socket processor due to minimal latency, low power requirements and low silicon area overhead.

Errors in communications between processor units and during encryption/decryption are a potential source of delay and latency. To ensure fast and efficient communication, such that is desired between two nodes of a multi-socket processor, a way of recognizing and correcting errors is needed. Transmission circuit 300 may store a backup of the data to be transmitted in retry buffer 302 in case of an error. Retry unit 304 of transmission circuit 300 can initiate a retransmission of data using the backup data stored in the retry buffer 302 if necessary. During packet formation at packet formation unit 306 of transmission circuit 300, an error detection code, such as checksums/CRC, is included in the packet header. If an error occurs during transmission through a communication medium, when the packet is received at the receiving circuit 400 it will fail an error detection check during de-framing. If the packet fails the error detection check, the receiving circuit 400 will request a retransmission of the data contained in the payload of the packet and the retry unit 305 of transmission circuit will initiate the retransmission.

During packet formation, a unique sequence number (SQN) is also added to the transmitted packets. The SQN is an integer that is increased by 1 every time a packet is sent. The receiving circuit 400 can use the SQN to detect missing or out of order packets. If a missing or out-of-order packet is detected, the receiving circuit 400 may request a retransmission of the data contained in the payload of the packet, and the retry unit 305 of transmission circuit may initiate the retransmission. Packets that are received correctly without error and in order are marked as received by receiving circuit 400, and an acknowledgement is sent from receiving 400 to the transmission circuit 300 from which the packet originated. The transmission circuit, upon receiving the acknowledgement, can delete the backup data stored in retry buffers 302 and ensure that it is still adding the correct SQN to any new packets to be sent to receiving circuit 400. Since SQN of the transmitted packets increase monotonically, they can be used to create a counter. SQN is used in both the transmission circuit 300 and receiving circuit 400 and, due to its predictable increase of 1 after each transmission, it can be presumed that the SQN at both the transmission circuit 300 and receiving circuit 400 are always the same value. Because of the matching values, the value of the SQN can also be used as the value of the initial variable when generating cipher digit streams at crypto units 305 and 403 at transmission circuit 300 and receiving circuit 400.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit, comprising:
    a first processor block configured to transform initial data into encrypted data using a cipher, the first processor block including:
    a first registry configured to store a first key and a first set of parameters;
    a first crypto circuit configured to generate a cipher digit stream from the first key and the first set of parameters, the first crypto circuit including a plurality of stages, each stage generating a subset of the cipher digit stream at a distinct clock cycle; and
    an encryption circuit configured to generate the encrypted data by applying the cipher digit stream to the initial data;
    a second processor block configured to transform the encrypted data into decrypted data, the decrypted data corresponding to the initial data, the second processor block including:
    a second registry configured to store a second key and a second set of parameters;
    a second crypto circuit configured to generate the cipher digit stream from the second key and the second set of parameters;
    a decryption circuit configured to generate the decrypted data by applying the cipher digit stream to the encrypted data; and
    a bus connecting the first processor block and the second processor block, the first processor block being configured to forward the encrypted data to the second processor block via the bus.

2. The circuit of claim 1, wherein the first and second processor blocks are nodes of a multi-socket processor.

3. The circuit of claim 1, wherein the cipher digit stream is a PRINCE block cipher.

4. The circuit of claim 1, wherein the first and second crypto circuits comprise at least two engine circuits, and wherein each engine circuit is configured to generate a finished portion of the cipher digit stream.

5. The circuit of claim 1, further comprising:
    a transmission circuit, located on the first processor block, configured to send a data packet across the bus, wherein the data packet includes the encrypted data, an error detection code and a unique sequence number;
    a receiver circuit, located on the second processor block, configured to receive the data packet from the bus and determine, based upon the error code and the unique sequence number, if the data packet needs to be resent; and
    a retry buffer block, located on the first processor block, configured to temporarily store a copy of the sent data packet and further configured to resend the copy of the data packet based upon the determination that the data packet needs to be resent.

6. The circuit of claim 1, wherein the first processor block is further configured to:
generate a symmetric key, initial value and a number used once;
write, in the first registry, the symmetric key as a value of the first key and the initial value and the number used once as values of the first set of parameters; and
instruct the second processor block to write, in the second registry, the symmetric key as a value of the second key and the initial value and number used once as values of the second set of parameters.

7. The circuit of claim 1, wherein at least one of the values of the first set of parameters is changed and at least one of the values of the second set of parameters is changed after the encrypted data is forwarded.

8. The circuit of claim 1, wherein the first processor block is further configured to update values of the first set of parameters and the second processor block is further configured to update values of the second set of parameters so that the second crypto circuit continues to generate the same cipher digit stream as the first crypto circuit.

9. The circuit of claim 8, wherein the second processor block is further configured to delay updating the values of the second set of parameters for a time period, the time period being the time between the first processor block updating the values of the first set of parameters and the second processor block receiving the encrypted data generated using the updated values of the first set of parameters.

10. The circuit of claim 1, wherein the first and second processor blocks each further include an input circuit configured to receive a signal and in response to receiving the signal the first and second processor blocks are further configured to reset values of the first key, second key, first set of parameters, and second set of parameters.

11. A method for high-speed low-latency secure chip-to-chip communication comprising:
storing, by a first processor block in a first registry a first key and a first set of parameters;
storing, by a second processor block in a second registry a second key and a second set of parameters;
generating, by a first crypto circuit of the first processor block, a cipher digit stream from the first key and the first set of parameters, the generating consisting of a plurality of stages, each stage generating a subset of the cipher digit stream, at a distinct clock cycle;
generating, by a second crypto circuit of the second processor block, the cipher digit stream from the second key and second set of parameters;
generating, by an encryption circuit of the first processor block, encrypted data by applying the cipher digit stream to initial data;
transferring, across a bus, the encrypted data from the first processor block to the second processor block; and
generating, by a decryption circuit of the second processor block, decrypted data by applying the cipher digit stream to the encrypted data, the decrypted data corresponding to the initial data.

12. The method of claim 11, wherein the first and wherein the first and second processor blocks are nodes of a multi-socket processor.

13. The method of claim 11, wherein the cipher digit stream is a PRINCE block cipher.

14. The method of claim 11, wherein the first and second crypto circuits comprise at least two engine circuits and the method further comprises generating, by the at least two engine circuits, a finished portion of the cipher digit stream.

15. The method of claim 11, further comprising:
storing, in a retry buffer block located on the first processor block, a copy of data in a data packet wherein the data packet includes the encrypted data, an error detection code and a unique sequence number;
sending, by a transmission circuit located on the first processor block, the data packet across the bus;
receiving, by a receiving circuit on the second processor block, the data packet from the bus;
determining, by the receiving circuit, based upon the error code and the unique sequence number, if the data packet needs to be resent; and
resending, by the transmission circuit, the copy of the data packet, containing the copy of the data, based upon the determination that the copy data packet needs to be resent.

16. The method of claim 11, further comprising:
generating, by the first processor block, a symmetric key, initial value and a number used once;
writing, in the first registry by the first processor block, the symmetric key as a value of the first key and the initial value and the number used once as values of the first set of parameters; and
instructing, by the first processor block, the second processor block to write, in the second registry, the symmetric key as a value of the second key and the initial value and number used once as values of the second set of parameters.

17. The method of claim 11, wherein at least one of the values of the first set of parameters is changed and at least one of the values of the second set of parameters is changed after the encrypted data is forwarded.

18. The method of claim 11, further comprising updating, by the first processor block, values of the first set of parameters and updating, by the second processor block, values of the second set of parameters so that the second crypto circuit continues to generate the same cipher digit as the first crypto circuit.

19. The method of claim 18, further comprising delaying, by the second processor block, the updating of the values of the second set of parameters for a time period, the time period being the time between the first processor block updating the values of the first set of parameters and the second processor block receiving the encrypted data generated using the updated values of the first set of parameters.

20. The method of claim 11, further comprising:
receiving, by an input circuit on the first and second processor blocks, an input signal; and
resetting, by the first and second processor blocks, values of the first key, second, key, first set of parameters, and second set of parameters in response to receiving the input signal.

* * * * *